United States Patent [19]

Schadewald et al.

[11] Patent Number: 5,468,735
[45] Date of Patent: Nov. 21, 1995

[54] TYLOSIN ANIMAL FEED PREMIX

[75] Inventors: Mary B. Schadewald, Indianapolis; Peter W. Vanevenhoven, West Terre Haute, both of Ind.

[73] Assignee: Eli Lilly and Company, Indianapolis, Ind.

[21] Appl. No.: 224,107

[22] Filed: Apr. 6, 1994

Related U.S. Application Data

[63] Continuation of Ser. No. 993,430, Dec. 21, 1992, abandoned.

[51] Int. Cl.⁶ .......................... A61K 31/70; A61K 47/00; A23L 1/00
[52] U.S. Cl. .............................. 514/30; 514/783; 426/531
[58] Field of Search ...................... 514/30, 783; 426/531

[56] References Cited

U.S. PATENT DOCUMENTS

| | | | |
|---|---|---|---|
| 2,733,145 | 1/1956 | Karr et al. | 426/72 |
| 3,178,341 | 4/1965 | Hamill et al. | 424/120 |
| 4,411,892 | 10/1983 | Celmer et al. | 514/30 |
| 4,536,494 | 8/1985 | Carter | 514/31 |
| 4,552,897 | 11/1985 | Asato et al. | 514/554 |
| 4,648,158 | 3/1987 | Asato et al. | 24/23 W |
| 4,797,275 | 1/1989 | Brooks et al. | 514/274 |
| 4,816,480 | 3/1989 | Toothill et al. | 514/460 |

FOREIGN PATENT DOCUMENTS 876440  8/1987  South Africa .

*Primary Examiner*—Raymond Henley, III
*Assistant Examiner*—Kevin E. Weddington
*Attorney, Agent, or Firm*—Woodard, Emhardt, Naughton Moriarty & McNett

[57] ABSTRACT

Described is a novel animal feed premix including corn cob granules and, incorporated in the corn cob granules, a tylosin antibiotic agent. A pharmaceutically acceptable buffer is also incorporated in the corn cob granules so as to increase the stability of the tylosin antibiotic agent against hydrolysis. Also described are a method for preparing the animal feed premix and a feed composition including the premix.

30 Claims, 2 Drawing Sheets

Tylosin A

Tylosin B

TYLOSIN ANIMAL FEED PREMIX

This application is a continuation of application Ser. No. 07/993,430, filed Dec. 21, 1992 now abandoned.

BACKGROUND

The present invention relates generally to premixes for incorporation into animal feeds. More particularly, the present invention relates to a premix composition including tylosin or a tylosin-based antibiotic agent, to a method for preparing this premix composition, and to an animal feed including this premix composition.

Tylosin and derivatives of tylosin are well known for their antibiotic activity. Effective against many bacteria, they are useful to treat a broad range of infections in animals. Administration of antibiotic agents such as tylosin or tylosin-based antibiotic agents to animals by way of their feeds is highly convenient and cost-effective. Usually, rather than incorporating antibiotic agents directly into the animal feed, the antibiotic agents are formulated into a concentrated premix containing antibiotic agent. This concentrated premix is then processed into animal feed to afford a medicated feed having the desired dose of antibiotic agent.

After their preparation, concentrated premixes are often stored for long periods prior to use. Thus, the long-term stability of the antibiotic agent in the premix is important. Moreover, in the preparation of animal feeds, the premix is subjected to further conditions that can be deleterious to the antibiotic agent. For example, in preparing pelletized feed, the premix including the antibiotic agent is first mixed with an animal feed material. The resulting mixture is processed by a pellet mill, which conventionally includes a steam conditioner. Such steam conditioners inject live steam into the feed mixtures to hydrate starch which is present. Afterwards, the mixture is run through the die of the pellet mill to process the animal feed into a form that is reduced to pellets. Temperatures in both the steam conditioner and the die can range up to about 100° C. Thus, extreme conditions are presented which can deleteriously affect antibiotics present in the feed. Furthermore, once prepared, the medicated animal feed will often be stored in a non-insulated facility such as a barn for later use. Thus, the storage of the animal feed can also result in conditions which cause a decrease in its antibiotic potency.

Tylosin and tylosin-based antibiotics lack long term stability against hydrolysis when in the presence of moisture and/or other components of animal feed. As a result, the stabilization of tylosin and tylosin-based antibiotic agents when incorporated into premixes, and when these premixes are incorporated into animal feeds, is highly important. The present invention addresses this need.

SUMMARY OF THE INVENTION

It has been discovered that excellent hydrolytic stability of tylosin and tylosin-based antibiotic compounds, and their pharmaceutically acceptable salts (hereinafter all together referred to as "tylosin antibiotic agents" or, singularly, a "tylosin antibiotic agent") is achieved when the tylosin antibiotic agent is incorporated in a granulated corn cob carrier together with a suitable pharmaceutically acceptable buffer. One preferred embodiment of the present invention therefore provides an animal feed premix composition comprising corn cob granules and, incorporated in the corn cob granules, a tylosin antibiotic agent and an effective amount of a pharmaceutically acceptable buffer so as to increase the stability of the tylosin antibiotic agent against hydrolysis.

Another preferred embodiment of the present invention provides a method for making an animal feed premix composition. The method comprises contacting a granulated corn cob carrier with a solution of a tylosin antibiotic agent so that the tylosin antibiotic agent is incorporated in the granulated corn cob carrier; contacting the granulated corn cob carrier with a solution of a pharmaceutically acceptable buffer so that the buffer is incorporated in the granulated corn cob carrier; and drying the granulated corn cob carrier having incorporated therein the tylosin antibiotic agent and the pharmaceutically acceptable buffer. Further, the pharmaceutically acceptable buffer is incorporated in the granulated corn cob carrier in an effective amount so as to increase the stability of the tylosin antibiotic agent against hydrolysis.

Still another preferred embodiment of the present invention provides an animal feed composition. The animal feed composition comprises an animal feed admixed with an animal feed premix, wherein the premix includes corn cob granules and, incorporated in the corn cob granules, a tylosin antibiotic agent and an effective amount of a pharmaceutically acceptable buffer so as to increase the stability of the tylosin antibiotic agent against hydrolysis.

The present invention thus provides animal feed premixes, medicated animal feeds and methods for their preparation, in which excellent stability of a tylosin antibiotic agent against hydrolysis is achieved. Further, premixes prepared in accordance with the invention have good handling and flow characteristics, and are dust-free. Also, premixes of the invention are resilient and durable, and are advantageously processed and incorporated into animal feed compositions. Additional objects, features and advantages of the invention will be apparent from the description herein.

DESCRIPTION

For the purpose of promoting an understanding of the principles of the invention, reference will now be made to preferred embodiments thereof. It will nevertheless be understood that no limitation of the scope of the invention is thereby intended, such alterations, further modifications and applications of the principles of the invention as described herein being contemplated as would normally occur to one skilled in the art to which the invention pertains.

In this document all percentages and parts are expressed as percentages and parts by weight unless otherwise stated. Similarly, temperatures are expressed in degrees Celcius (° C.) unless otherwise indicated.

As indicated above, preferred embodiments of the present invention involve the use of granulated corn cob carriers to prepare animal feed premixes suitable for incorporation into animal feeds. In this regard, granulated corn cob carriers are known edible feed additives, and the particular granulated corn cob carrier used in the present invention is not critical. Suitable granulated corn cob carriers can be prepared using known techniques or they can be commercially obtained.

Further, the granulated corn cob carrier employed in the present invention can have any particle size desired; however, for use in the invention, the granulated corn cob carrier preferably has an average particle size of about 20 to about 100 mesh (U.S. seive), and more preferably an average particle size of about 40 to about 60 mesh.

The particular buffer used in the invention is likewise not critical, so long as it is one of the many known pharmaceutically acceptable buffers and has a neutralizing effect on the acidity of (i.e. increases the pH of) the granulated corn cob carrier so that an increase in the stability of the tylosin antibiotic agent against hydrolysis can be achieved. Preferred pharmaceutically acceptable buffers for use in the present invention are phosphate-based buffers, including for example $K_2HPO_4$ (dibasic potassium phosphate), potassium metaphosphate, trisodium phosphate, and disodium phosphate.

Figure 2A:
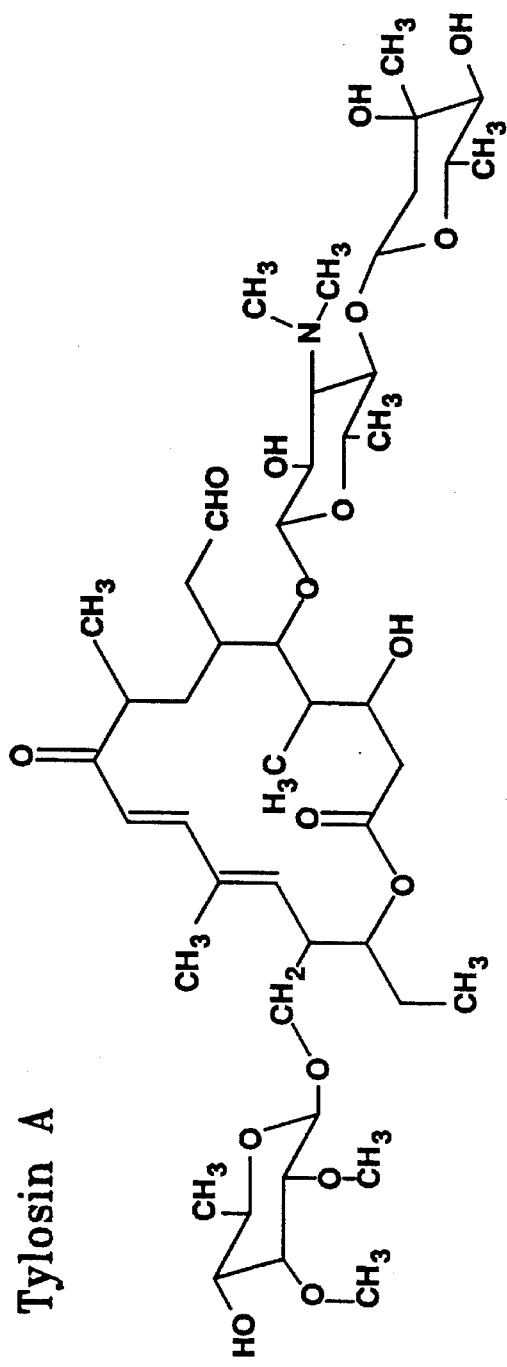
FIG. 2 sets forth chemical diagrams of the structures of tylosin Factor A and its hydrolysis product, tylosin Factor B.
Figure 2B:
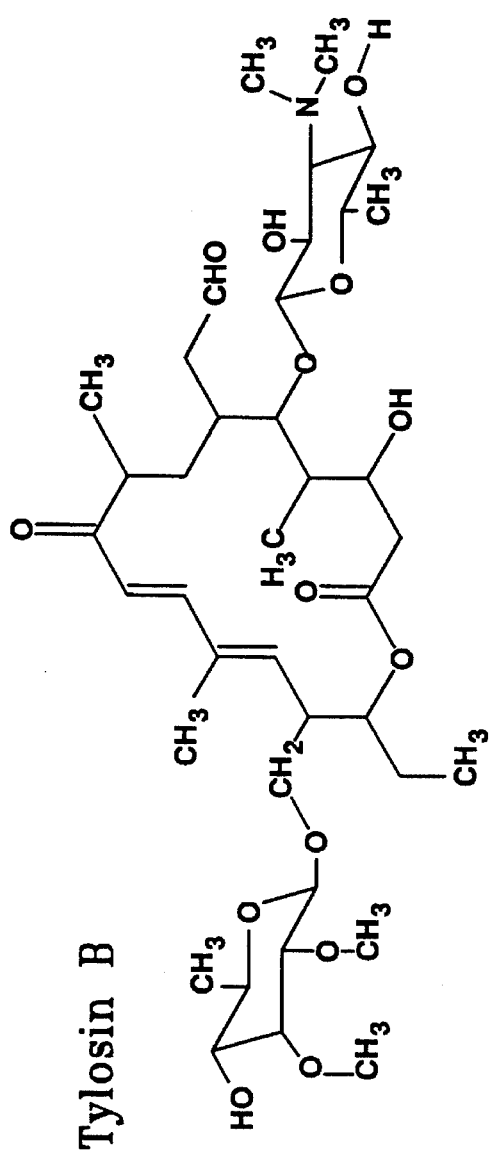

The pharmaceutically acceptable buffer will be included in the premix composition in an amount that is effective to increase the stability of the tylosin antibiotic agent against hydrolysis. This may be determined, for example, by monitoring the amount of tylosin Factor B present in the premix composition over time because tylosin Factor B is the product that results from the hydrolysis of the desired tylosin Factor A (see FIG. 2). Preferred premix compositions of the invention will be about 1% to about 20% by weight comprised of the pharmaceutically acceptable buffer, and more preferably about 3% to about 15% by weight comprised of this buffer. Additionally, it is preferred that the incorporation of the pharmaceutically acceptable buffer causes the granulated corn cobs to have a pH of about 6 to about 9.5, as can be determined by slurrying 5 grams of the granulated corn cobs in 100 ml of water and measuring the pH of the slurry. These amounts of buffer and these pH's provide advantageous stability to the tylosin antibiotic agent when incorporated in premixes of the invention and when these premixes are included in animal feeds.

The tylosin antibiotic agent used in the invention can be tylosin or a tylosin-based antibiotic, or one of their pharmaceutically acceptable salts. These tylosin antibiotic agents are hydrolytically unstable in the presence of moist, acidic conditions which exist in granulated corn cob carriers and in animal feed compositions containing the granulated corn cob carriers. Pharmaceutically acceptable salts of tylosin or of tylosin-based antibiotics are preferred for use in the present invention.

Representative pharmaceutically acceptable salts include salts derived from non-toxic inorganic acids such as hydrochloric acid, nitric acid, phosphoric acid, sulfuric acid, hydrobromic acid, hydroiodic acid, phosphorous acid and others, as well as salts derived from non-toxic organic acids such as aliphatic mono and dicarboxylic acids, phenyl-substituted alkanoic acids, hydroxyalkanoic and hydroxyalkandioic acid, aromatic acids, aliphatic and aromatic sulfonic acids, and the like. Such pharmaceutically acceptable salts thus include sulfate, pyrosulfate, bisulfate, sulfite, bisulfite, nitrate, phosphate, monohydrogenphosphate, dihydrogenphosphate, metaphosphate, pyrophosphate, chloride, bromide, iodide, acetate, propionate, caprylate, acrylate, formate, isobutyrate, caprylate, heptanoate, propionate, oxalate, malonate, succinate, tartarate, suberate, sebecate, fumarate, maleate, mandelate, butyne-1,4-dioate, hexyne-1, 6-dioate, benzoate, chlorobenzoate, methylbenzoate, dinitrobenzoate, hydroxybenzoate, methoxybenzoate, phthalate, terephthalate, benzenesulfonate, toluenesulfonate, chlorobenzenesulfonate, xylenesulfonate, phenylacetate, phenylpropionate, phenylbutyrate, citrate, lactate, beta-hydroxybutyrate, glycollate, maleate, naphthalene-1-sulfonate, naphthalene-2-sulfonate, mesylate, etc.

The solvent or solvents used in preparing preferred premixes of the invention will have the capacity to dissolve the tylosin antibiotic agent and/or the pharmaceutically acceptable buffer, so that they can be effectively incorporated in the corn cob granules when the granules are contacted by and absorb the solution. Preferred solvents for use with the pharmaceutically acceptable buffer and the tylosin antibiotic agent include water and/or volatile organic solvents such as alcohols, especially lower alcohols such as methanol, ethanol, propanol or the like.

The tylosin antibiotic agent and pharmaceutically acceptable buffer may be applied to the granulated corn cob carrier in the same solution or in separate solutions. When separate solutions are used, it is not critical which component, the tylosin antibiotic agent or the buffer, is first applied to the corn cob granules. Thus, the buffer solution may be applied before, at the same time as, or after the antibiotic solution. Preferably, however, the buffer solution is applied before the tylosin antibiotic agent solution. After both components have been incorporated in the granulated corn cob carrier, the carrier is dried, preferably so as to contain less than about 10% moisture, in order to inhibit mold or mildew. The resulting animal feed premix composition has both the pharmaceutically acceptable buffer and the tylosin antibiotic agent incorporated therein, and has proven to maintain the tylosin antibiotic agent with good hydrolytic stability, as demonstrated in the specific Examples below.

The concentration of the tylosin antibiotic compound in the premix is not critical in the present invention. The antibiotic potency of the final animal feed can be regulated by varying the amount of premix incorporated and/or by varying the concentration of antibiotic in the premix. Premixes containing the tylosin antibiotic agent at a potency level of about 10 to about 300 mg/g on a dry weight basis are economical and convenient, and are therefore preferred. Even more preferred are premixes containing the tylosin antibiotic agent at a potency level of about 100 to about 300 mg/g (dry weight basis).

In use, the premix composition of the invention is incorporated into animal feed, for instance cattle or swine feed, so as to form a medicated animal feed having the desired antibiotic potency. To accomplish this, the premix composition is first mixed with an animal feed. The components in the animal feed and the ratios of these components to each other will vary widely. However, animal feeds will typically include particulate animal- and/or vegetable-derived proteinaceous materials as well as animal and/or vegetable fats or oils. For example, animal feeds may include animal meal, for example fish meal, animal fat, ground cereal grains such as wheat, oats, rye, or barley, soybean meal, ground corn, and/or ground oil seeds such sunflower seeds. Animal feeds may also include small amounts of vitamins and minerals, for example in the form of limestone or dicalcium phosphate, vitamins A, D and/or E, and others.

After the premix of the invention is incorporated into the animal feed, the mixture will be conventionally processed into one of the various forms typical for animal feeds. For example, pelletized animal feed of the invention can be prepared using conventional pellet milling techniques as previously described in the Background.

As mentioned above, premixes of the invention will be incorporated into animal feed to afford an animal feed having the desired dosage of the tylosin antibiotic agent. Typically, the premixes will be incorporated into animal feeds so as to afford animal feeds containing about 1 to about 50 grams of the tylosin antibiotic agent per ton (U.S.) of feed. For example, a preferred cattle feed will contain about 5 to about 10 grams of the tylosin antibiotic agent per ton, and a preferred swine feed will contain about 20 to about 40 grams of the tylosin antibiotic agent per ton.

To promote a further understanding of the invention and its preferred features, the following specific Examples are provided. It will be understood that these Examples are illustrative, and not limiting, of the invention.

EXAMPLES

Preparation of Premix and Feed Compositions

An animal feed premix having a tylosin potency of about 275 mg/g was prepared in accordance with the invention. Thus, 42.6 parts of granulated corn cobs, 49.4 parts of a 37.3 mg/g aqueous solution of tylosin (phosphate salt), and 8.0 parts of a 50% aqueous $K_2HPO_4$ solution were thoroughly admixed, and the resulting preparation dried to form a medicated premix composition containing about 275 mg/g tylosin and 6% $K_2HPO_4$. More particularly, 3175 g of 40-60 mesh granulated corn cobs (Anderson's Cob Division Processing Group, Maumee, Ohio, U.S.A.) were first charged to a ribbon mixer. 3686 g of the 37.3 mg/g aqueous solution of tylosin, phosphate salt (representing about 1375 g of the tylosin) were then added to granulated corn cobs in the mixer. The resulting preparation was mixed for 10 minutes. 600 g of the 50% $K_2HPO_4$ solution were then added to the mixer, and the resulting preparation containing the granulated corn cobs, tylosin and buffer was mixed for an additional 10 minutes to ensure an even distribution of materials. The preparation was then either tray dried in an oven or dried in a fluidized bed dryer. The dried preparation was then screened to remove agglomerated particles, and the agglomerated particles broken, for example by processing in a Fitz mill, and returned to the batch.

Additional premixes were prepared in an analogous fashion to that above, except varying the ratios of the granulated corn cobs, the 37.3 mg/g tylosin phosphate solution, and 50% $K_2HPO_4$ buffer solution employed. Thus premixes each having 275 mg/g tylosin, but having respective buffer contents of 3, 5, 8, 10 and 12 weight percent were prepared by blending, respectively: 46.6 parts granulated corn cobs/49.4 parts tylosin phosphate solution/4.0 parts $K_2HPO_4$ solution; 44.6 parts granulated corn cobs/48.8 parts tylosin phosphate solution/6.6 parts $K_2HPO_4$ solution; 41.8 parts granulated corn cobs/47.8 parts tylosin phosphate solution/10.4 parts $K_2HPO_4$ solution; 41.9 parts granulated corn cobs/45.7 parts tylosin phosphate solution/12.4 parts $K_2HPO_4$ solution; and 38.2 parts granulated corn cobs/46.6 parts tylosin phosphate solution/15.2 parts $K_2HPO_4$ solution. The resulting materials were dried and processed as above, and used in stability testing as reported below.

Stability Testing of Premix and Feed Compositions

Figure 1:
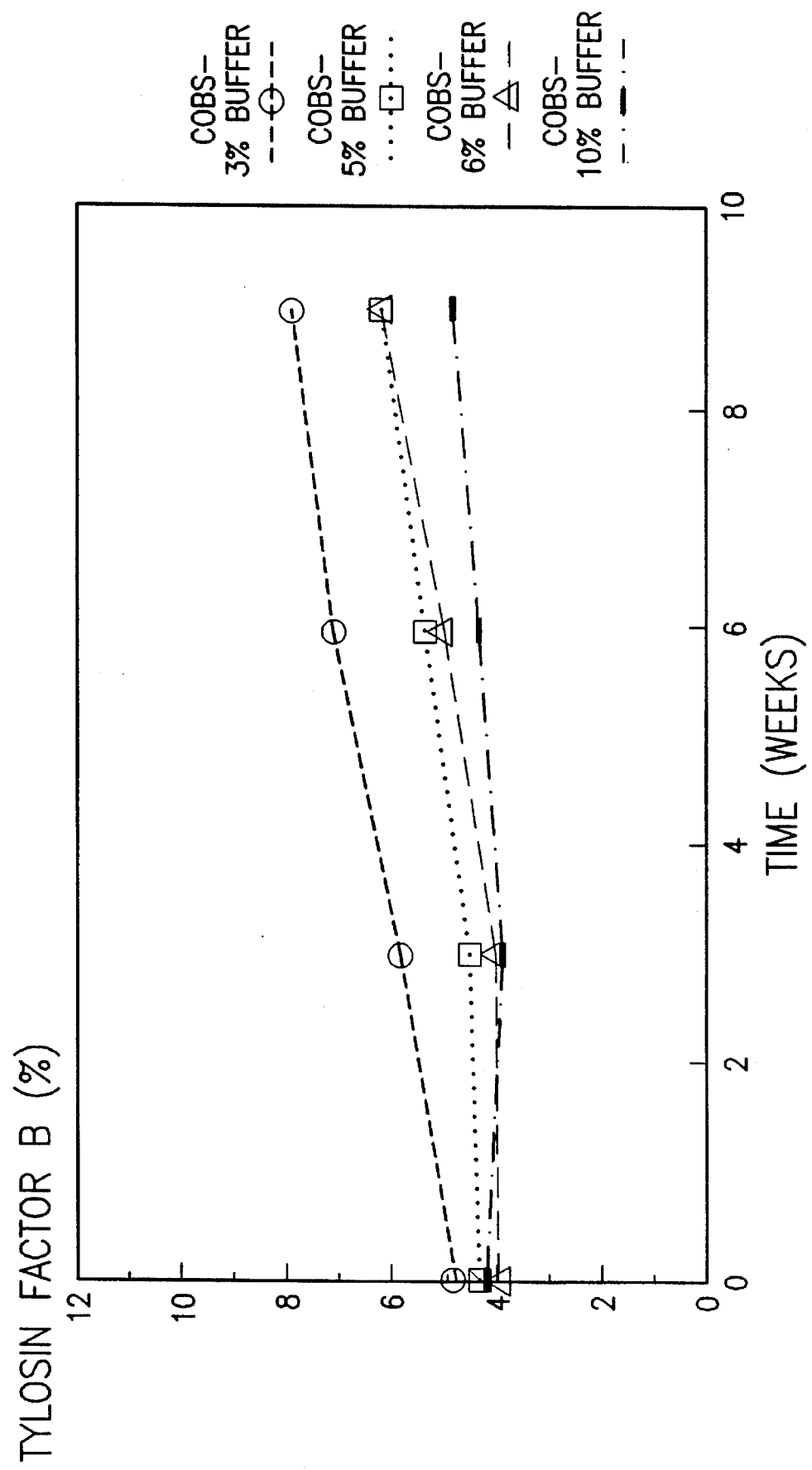
FIG. 1 is a graph demonstrating the stability of animal feeds including premixes of the invention. The graph shows % tylosin Factor B present in the animal feed samples as a function of time, when the samples were subjected to moist heat (37° C., 75% relative humidity).

Animal feed premixes of the invention prepared as above were tested for stability under dry heat or moist heat conditions, alone or admixed with a high-fat swine feed, "SW90". The stability of the tylosin in the medicated premixes was measured by monitoring % tylosin Factor B in the tested samples over time, or by measuring the retention of bio yield values in the tested samples by autoturbidometric analysis. FIG. 1 and Tables 1 through 5 set forth the results of this testing, and demonstrate the advantageous stability achieved in premixes and animal feed compositions prepared in accordance with the invention.

FIG. 1 sets forth the results of a 9-week (37° C., 75% relative humidity) stability study of 3%, 5%, 6% and 10% buffer premixes prepared as above and blended with SW90. As shown, under the moist heat conditions employed, increasing stability of the tylosin was noted with increasing buffer content (i.e. higher buffer content in the premixes led to decreased buildup of tylosin Factor B over the period of the testing).

Tables 1 and 2 below show the stability of the tylosin in 3%, 6% and 12% buffer premixes (prepared as above) by monitoring % tylosin Factor B in the premixes over time at 80° C. and 120° C., respectively. As demonstrated, good stability was achieved and the dry heat stability of the tylosin in the premixes increases with increasing buffer content.

TABLE 1

Dry Heat at 80° C. for 5 hours

| Sample ID | % Factor B Before | % Factor B After |
|---|---|---|
| Tylosin on Cobs w/3% Buffer | 4.8 | 7.5 |
| Tylosin on Cobs w/6% Buffer | 4.4 | 4.8 |
| Tylosin on Cobs w/12% Buffer | 3.4 | 3.5 |

TABLE 2

Dry Heat Oven at 120° C. for 2½ hours

| Sample ID | % Factor B Before | % Factor B After |
|---|---|---|
| Tylosin on Cobs w/3% Buffer | 4.8 | 37.9 |
| Tylosin on Cobs w/6% Buffer | 4.4 | 16.1 |
| Tylosin on Cobs w/12% Buffer | 3.4 | 7.4 |

Tables 3, 4 and 5 below show dry heat stability (at 80° C. for 6 hours) of premixes of the invention themselves and of animal feed compositions prepared by admixing the premixes with SW90. In particular, Table 3 sets forth the results of bio yield testing of samples before and after the 6-hour dry heat treatment. More specifically, reported in Table 3 is the percent of the initial bio yield value that was retained by a 3% buffer premix (prepared as above) after the 6-hour dry heat treatment. A similar percentage is set forth as to an animal feed prepared by blending the 3% buffer premix with SW90 to a final tylosin potency of 13.8 mg/g.

Tables 4 and 5 set forth the results of similar stability testing of a 5% buffer premix (prepared as above) and of an animal feed prepared by blending this 5% buffer premix with SW90 to a final tylosin potency of 13.8 mg/g. Table 4 shows the % tylosin Factor B in the premix and in the animal feed before and after the 6-hour dry heat treatment, and Table 5 shows the percentage of the initial bio yield value retained in such samples after the treatment. The results further demonstrate the advantageous stability of the tylosin in premixes and animal feed compositions of the invention. Again, increasing tylosin stability is obtained with increasing buffer content.

TABLE 3

| Dry Heat Oven at 80° C. for 6 Hours | |
| --- | --- |
| Sample ID | % Bio Yield Retained |
| Tylosin on Cobs w/3% buffer | 97.6 |
| Tylosin on Cobs w/3% buffer & SW 90 (13.8 mg/g) | 86.8 |

TABLE 4

| Dry Heat Oven at 80° C. for 6 Hours | | |
| --- | --- | --- |
| Sample ID | % Factor B Before | % Factor B After |
| Tylosin on Cobs w/5% Buffer | 4.2 | 4.7 |
| Tylosin on Cobs w/5% Buffer in SW 90 (13.8 mg/g) | 4.6 | 4.6 |

TABLE 5

| Dry Heat Oven at 80° C. for 6 Hours | |
| --- | --- |
| Sample ID | % Bio Yield Retained |
| Tylosin on Cobs w/5% buffer | 100+ |
| Tylosin on Cobs w/5% buffer in SW 90 (13.8 mg/g) | 98.3 |

While the invention has been illustrated and described in detail in the foregoing description, the same is to be considered as illustrative and not restrictive in character, it being understood that only the preferred embodiments have been described and that all changes and modifications that come within the spirit of the invention are desired to be protected.

What is claimed is:

1. An animal feed premix composition, comprising corn cob granules, and, incorporated in the corn cob granules, a tylosin antibiotic agent and an effective amount of a pharmaceutically acceptable buffer which neutralizes the acidity of said corn cob granules so as to increase the stability of the tylosin antibiotic agent against hydrolysis in the presence of moisture within said corn cob granules.

2. The animal feed premix composition of claim 1 wherein the tylosin antibiotic agent is tylosin or a pharmaceutically acceptable salt thereof.

3. The animal feed premix composition of claim 1 wherein the pharmaceutically acceptable buffer is a phosphate buffer.

4. The animal feed premix composition of claim 2 wherein the antibiotic agent is included in the premix composition at a potency of about 10 to about 300 milligrams per gram, on a dry weight basis.

5. The animal feed premix composition of claim 4 wherein the pharmaceutically acceptable buffer is a phosphate buffer.

6. The animal feed premix composition of claim 5 which is about 3% to about 20% by weight comprised of the phosphate buffer.

7. The animal feed premix composition of claim 6 wherein the tylosin antibiotic agent is included in the premix composition at a potency of about 100 to about 300 milligrams per gram, on a dry weight basis.

8. The animal feed premix composition of claim 7 wherein the corn cob granules have an average particle size of about 20 to 100 mesh.

9. The animal feed premix composition of claim 8 wherein the corn cob granules have an average particle size of about 40 to about 60 mesh.

10. The animal feed premix composition of claim 8 which has a moisture content of less than about 10% by weight.

11. The animal feed premix composition of claim 10 wherein the phosphate buffer is $K_2HPO_4$.

12. A method for making an animal feed premix composition, comprising:

contacting a granulated corn cob carrier with a solution of a tylosin antibiotic agent so that the antibiotic agent is incorporated in the granulated corn cob carrier;

contacting the granulated corn cob carrier with a solution of a pharmaceutically acceptable buffer which neutralizes the acidity of said granulated corn cob carrier so that the buffer is incorporated in the granulated corn cob carrier, said solution of pharmaceutically acceptable buffer being the same solution or a separate solution from said solution of tylosin antibiotic agent; and drying the granulated corn cob carder having incorporated therein the antibiotic agent and pharmaceutically acceptable buffer;

said pharmaceutically acceptable buffer being incorporated in the granulated corn cob carrier in an effective amount so as to increase the stability of the antibiotic agent against hydrolysis in the presence of moisture within said granulated corn cob carrier.

13. The method of claim 12 comprising contacting the granulated corn cob carrier with separate solutions containing, respectively, the tylosin antibiotic agent and the pharmaceutically acceptable buffer.

14. The method of claim 12 comprising conducting said drying step so as to reduce the moisture content of the premix composition to less than about 10% by weight.

15. The method of claim 12 wherein the tylosin antibiotic agent is tylosin or a pharmaceutically acceptable salt thereof.

16. The method of claim 12 which includes incorporating sufficient tylosin or pharmaceutically acceptable tylosin salt so that the premix composition has a potency thereof of about 100 to about 300 mg/g on a dry weight basis.

17. The method of claim 12 wherein the buffer is phosphate buffer.

18. The method of claim 17 wherein the antibiotic agent is tylosin or a pharmaceutically acceptable salt thereof, and wherein it is incorporated in sufficient amount so that the premix composition has a potency thereof of about 10 to about 300 mg/g on a dry weight basis.

19. The method of claim 18 wherein the tylosin antibiotic agent is the phosphate salt of tylosin.

20. An animal feed composition, comprising:

an animal feed admixed with an animal feed premix, wherein the animal feed premix includes corn cob granules and, incorporated in said corn cob granules, a tylosin antibiotic agent and an effective amount of a pharmaceutically acceptable buffer which neutralizes the acidity of said corn cob granules so as to increase the stability of the tylosin antibiotic agent against hydrolysis in the presence of moisture within said corn cob granules.

21. The medicated feed composition of claim 20 wherein the antibiotic agent is tylosin or a pharmaceutically acceptable salt thereof.

22. The medicated feed composition of claim 21 wherein the antibiotic agent is included in the premix at a potency of about 10 to about 300 mg/g on a dry weight basis.

23. The medicated feed composition of claim 22 wherein the antibiotic agent is a pharmaceutically acceptable salt of tylosin.

24. The medicated feed composition of claim 23 wherein the pharmaceutically acceptable buffer is a phosphate buffer.

25. The medicated feed composition of claim 24 wherein the antibiotic agent is the phosphate salt of tylosin.

26. An animal feed premix composition, comprising:

corn cob granules having an average particle size of about 20 to about 100 mesh and, incorporated in the corn cob granules, a pharmaceutically acceptable phosphate buffer and a tylosin antibiotic agent;

said animal feed premix composition being about 3% to about 20% by weight comprised of the phosphate buffer so as to increase the stability of the tylosin antibiotic agent; and said animal feed premix composition including the tylosin antibiotic agent at a potency level of about 100 to about 300 mg/g.

27. The animal feed premix composition of claim 26 which has a moisture content of less than about 10%.

28. The animal feed premix composition of claim 27 wherein the tylosin antibiotic agent is a pharmaceutically acceptable salt.

29. The animal feed premix composition of claim 28 wherein the pharmaceutically acceptable salt is a phosphate salt.

30. The animal feed premix composition of claim 29 wherein the corn cob granules have an average particle size of about 40 to about 60 mesh.

* * * * *